(12) United States Patent
Kim

(10) Patent No.: US 9,075,437 B2
(45) Date of Patent: Jul. 7, 2015

(54) TACTILE PRESENTATION APPARATUS, TACTILE CELL, AND METHOD FOR CONTROLLING TACTILE PRESENTATION APPARATUS

(75) Inventor: Young Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 722 days.

(21) Appl. No.: 13/335,806

(22) Filed: Dec. 22, 2011

(65) Prior Publication Data

US 2012/0161948 A1 Jun. 28, 2012

(30) Foreign Application Priority Data

Dec. 23, 2010 (KR) .......................... 10-2010-0133622

(51) Int. Cl.
*G06F 3/01* (2006.01)
*G09B 21/00* (2006.01)

(52) U.S. Cl.
CPC .............. *G06F 3/016* (2013.01); *G09B 21/003* (2013.01)

(58) Field of Classification Search
CPC ..... G06F 3/016; G06F 3/0362; G06F 3/0488; G06F 2203/013–2203/015; G06F 2203/04108; G05G 9/047; G09B 21/003; G01C 21/3664
USPC .................... 340/407.1–407.2; 345/173–178; 341/20–27, 34; 116/205
See application file for complete search history.

(56) References Cited

U.S. PATENT DOCUMENTS

| | | | | |
|---|---|---|---|---|
| 5,784,052 A * | 7/1998 | Keyson | ........................ | 345/167 |
| 5,842,867 A * | 12/1998 | Hong et al. | ................... | 434/114 |
| 6,002,184 A * | 12/1999 | Delson et al. | ................... | 310/14 |
| 6,147,422 A * | 11/2000 | Delson et al. | ................... | 310/14 |
| 6,307,285 B1 * | 10/2001 | Delson et al. | ................... | 310/14 |
| 6,430,450 B1 * | 8/2002 | Bach-y-Rita et al. | ......... | 607/134 |
| 6,545,852 B1 * | 4/2003 | Arnold | ......................... | 361/160 |
| 7,489,303 B1 * | 2/2009 | Pryor | ............................. | 345/173 |
| 7,737,828 B2 | 6/2010 | Yang et al. | | |
| 8,294,557 B1 * | 10/2012 | El Saddik et al. | .......... | 340/407.1 |
| 2004/0136571 A1 * | 7/2004 | Hewitson et al. | ............. | 382/114 |
| 2005/0158695 A1 * | 7/2005 | Takahashi | ..................... | 434/113 |
| 2008/0122589 A1 * | 5/2008 | Ivanov | ....................... | 340/407.1 |
| 2008/0158178 A1 * | 7/2008 | Hotelling et al. | ............. | 345/173 |

(Continued)

FOREIGN PATENT DOCUMENTS

| | | |
|---|---|---|
| JP | 2004-157749 | 6/2004 |
| KR | 1020090038656 | 4/2009 |
| KR | 10-0901359 | 6/2009 |

OTHER PUBLICATIONS

Ha, Taejin et al., Enhancing Immersiveness in Video see-through HMD based Immersive Model Realization, pp. 685-686 (2006).

*Primary Examiner* — Hai Phan
*Assistant Examiner* — Orlando Bousono
(74) *Attorney, Agent, or Firm* — Nelson Mullins Riley & Scarborough LLP

(57) ABSTRACT

Disclosed is a tactile presentation apparatus including a plurality of tactile cells. Each of the plurality of tactile cells includes a supporter for shielding magnetic force, a tactile feeder moving up according to the magnetic force in the supporter, and an electromagnet generating magnetic force depending on depth information of a pixel. The tactile presentation apparatus includes a permanent magnet, a vibration device that vibrates according to texture information, and a pressure sensor measuring pressure applied to the tactile feeder.

12 Claims, 6 Drawing Sheets

(56) References Cited

U.S. PATENT DOCUMENTS

| | | | |
|---|---|---|---|
| 2008/0196541 A1* | 8/2008 | Kramlich | 74/553 |
| 2008/0211779 A1* | 9/2008 | Pryor | 345/173 |
| 2009/0051863 A1* | 2/2009 | Meisner | 349/143 |
| 2009/0256689 A1* | 10/2009 | Nakaya et al. | 340/407.1 |
| 2010/0182137 A1* | 7/2010 | Pryor | 340/425.5 |
| 2010/0200351 A1* | 8/2010 | Boese et al. | 192/21.5 |
| 2011/0025602 A1* | 2/2011 | Sivan et al. | 345/156 |
| 2011/0037725 A1* | 2/2011 | Pryor | 345/174 |
| 2011/0235154 A1* | 9/2011 | Ji | 359/290 |
| 2011/0309918 A1* | 12/2011 | Ramsay | 340/407.1 |
| 2012/0038581 A1* | 2/2012 | Hotelling et al. | 345/173 |

* cited by examiner

TACTILE PRESENTATION APPARATUS, TACTILE CELL, AND METHOD FOR CONTROLLING TACTILE PRESENTATION APPARATUS

CROSS-REFERENCE TO RELATED APPLICATION

This application claims priority to and the benefit of Korean Patent Application No. 10-2010-0133622 filed in the Korean Intellectual Property Office on Dec. 23, 2010, the entire contents of which are incorporated herein by reference.

BACKGROUND OF THE INVENTION (a) Field of the Invention

The present invention relates to a tactile presentation apparatus and a method for controlling the tactile presentation apparatus.

(b) Description of the Related Art

A 4-dimension (4D) called in a movie industry is different from that in physics. 4D in physics means a temporal space generated by adding an element such as a time to a 3D space, but a 4D technology in the movie industry is referred to as a technology that adds an actual effect to viewers by providing physical effects such as wind, vibration of a chair, flash lighting, a smell, water ejection, and the like together with a 3D picture providing a 3D effect. That is, the 4D technology in the movie industry means that one technology is added to the 3D picture. Tactile technologies such as movement of a seat and the wind are added to the 3D stereoscopic picture primarily in a theme amusement park or a cinema to provide 4D sensory services.

The 4D technology does not always need to be accompanied with the 3D stereoscopic picture. Even though the picture itself is produced by not the 3D stereoscopic picture but a general 2D picture, the picture is shown in a 4D facility and the physical effects are provided to the picture to implement the 4D technology. Therefore, the largest feature of the 4D technology is in that a sensory physical stimulus is given to a user. The 4D technology is used to improve an immersion degree in picture contents primarily using a sense of vision and a sense of hearing by stimulating human senses (primarily, a sense of smell and a sense of touch).

An example of a tactile presentation technology in the related art includes an airborne ultrasound tactile display technology added to feedback to perceive tactility from a hologram displayed in a 3D space. According to the technology, an ultrasound phenomenon called acoustic radiation pressure is grafted to a hologram technology. In other words, a 3D stereoscopic display coupled with a tactile apparatus generating pressure provides tactility that interacts with the 3D picture. For example, a user can bounce a virtual ball, feel virtual rain drops that drop on a hand, and feel a virtual living organism that crawls along a palm.

Another example of the tactile presentation technology in the related art may include a system that enables feeling tactility of a stereoscopic picture, i.e., a touched 3D TV. According to the touched 3D TV technology, the viewer can feel tactility transferred to a fingertip through a kind of thimble device worn on a finger. The thimble device incorporates a micro-vibration device and transfers minute vibration according to movement of the finger picked up by a plurality of cameras installed around the TV and the structure of the stereoscopic picture.

Yet another example of the tactile presentation technology in the related art may include a multijoint haptic device. When the user moves a handle while holding the handle in his/her hand by using the device, the user can have a vivid feeling of throwing and realistically receive an iron ball hung on a spring.

Further, although various artificial tactile presentation apparatuses have been developed, the related arts require a lot of additional devices to deteriorate reality or a surface shape of a predetermined object or tactile information on a small object may not be normally expressed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a tactile presentation apparatus having high resolution.

An exemplary embodiment of the present invention provides a tactile presentation apparatus, including a plurality of tactile cells, and the number of the plurality of tactile cells is equal to the number of pixels of a depth image, and each of the plurality of tactile cells implements depth information and texture information on the depth image and measures applied pressure information.

The tactile presentation apparatus may further include a controller providing a magnetic force control voltage depending on the depth information on the depth image to the plurality of tactile cells.

Each of the plurality of tactile cells may include a textile reactor generating magnetic force of an electromagnet according to the magnetic force control voltage, and a tactile feeder that moves up or down according to the magnetic force.

The tactile feeder may include a permanent magnet on the bottom thereof.

The tactile feeder may include a pressure sensor measuring applied pressure.

Each of the plurality of tactile cells may further include a supporter shielding the magnetic force, guiding movement of the tactile feeder, and surrounding the tactile feeder and the tactile reactor.

The controller may provide a vibration control voltage according to the texture information of the depth image to the plurality of tactile cells, and each of the plurality of tactile cells may further include an ultrasound vibration device that vibrates according to the vibration control voltage.

The supporter may include an interface line that provides the vibration control voltage corresponding to the texture information to the ultrasound vibration device through a touch point with the tactile feeder, and receives a pressure measurement signal from the pressure sensor to feed back the received pressure measurement signal to a picture system.

The controller may include a memory including a magnetic force control voltage table and a vibration control voltage table, the controller may verify a compensation voltage value corresponding to the depth information of the depth image in the magnetic force control voltage table to provide the magnetic force control voltage to the plurality of tactile cells, and the controller may verify a compensation voltage value corresponding to the texture information of the depth image in the vibration control voltage table to provide the vibration control voltage to the plurality of tactile cells.

Another exemplary embodiment of the present invention provides a tactile cell, including: a supporter for shielding magnetic force; a tactile feeder moving up according to the magnetic force in the supporter; and a tactile reactor generating magnetic force depending on depth information of a pixel to provide the generated magnetic force to the tactile feeder.

The tactile feeder may include a pressure sensor measuring applied pressure.

The tactile feeder may further include an ultrasound vibration device that vibrates according to vibration control voltage corresponding to texture information.

The supporter may include an interface line that provides the vibration control voltage to the ultrasound vibration device and provides a pressure measurement signal from the pressure sensor to a picture system.

The tactile feeder may include a permanent magnet in the lower part thereof.

Yet another exemplary embodiment of the present invention provides a method for controlling a tactile presentation apparatus, including: receiving information on the position and depth of a pixel of a picture; generating magnetic force control voltage according to the depth; and providing current to an electromagnet to a tactile cell corresponding to the position through the magnetic force control voltage, and the tactile cell includes a tactile feeder that moves up or down by magnetic force generated by the electromagnet.

The generating of the magnetic force control voltage may include verifying a compensation voltage value corresponding to the depth in a magnetic force control voltage table, and generating a magnetic force control voltage corresponding to the verified voltage value.

The tactile feeder may include a pressure sensor measuring applied pressure, and the tactile presentation method may further include providing a pressure measurement signal from the pressure sensor to a picture system.

The tactile feeder may further include a vibration device, and the tactile presentation method may further include receiving information on texture of the pixel, generating the vibration control voltage corresponding to the texture, and providing the vibration control voltage to the vibration device.

The generating of the vibration control voltage may include verifying a compensation voltage value corresponding to the texture in a vibration control voltage table, and generating the vibration control voltage corresponding to the verified voltage value.

DETAILED DESCRIPTION OF THE EMBODIMENTS

Figure 1:
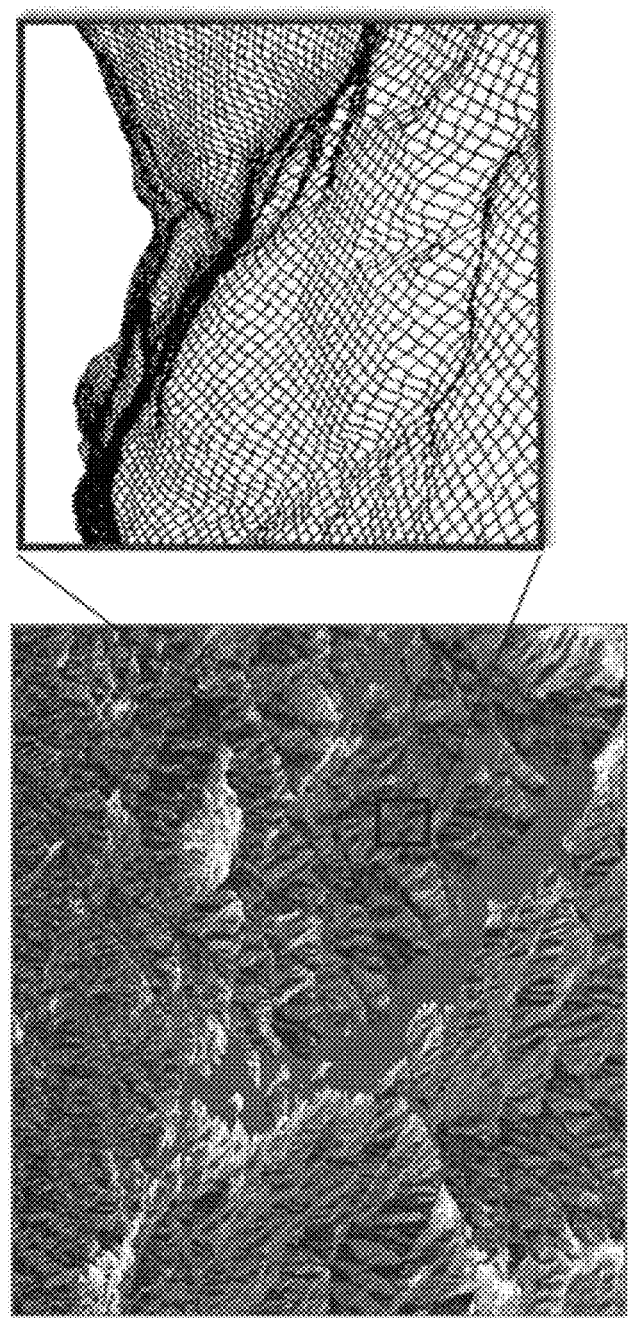
FIG. 1 shows a process of simply illustrating an image photographed from an aircraft.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements.

Hereinafter, a tactile presentation apparatus according to an exemplary embodiment of the present invention will be described with reference to the accompanying drawings.

FIG. 1 shows a process of simply illustrating a picture photographed from an aircraft. In particular, FIG. 1A shows geographical features photographed from an aircraft, and FIG. 1B shows a 3D picture simply illustrating the geographical features photographed from the aircraft.

As shown in FIG. 1B, height or depth information may be expressed as the heights of a plurality of meshes. Therefore, if the depth information can be acquired from a predetermined picture, the 3D tactility may be expressed through a mechanical mesh structure. The 3D tactility presentation method is similar to a method in which a blind person reads letters through a texture that is felt on paper while putting his/her hand on a book of braille.

Figure 2:
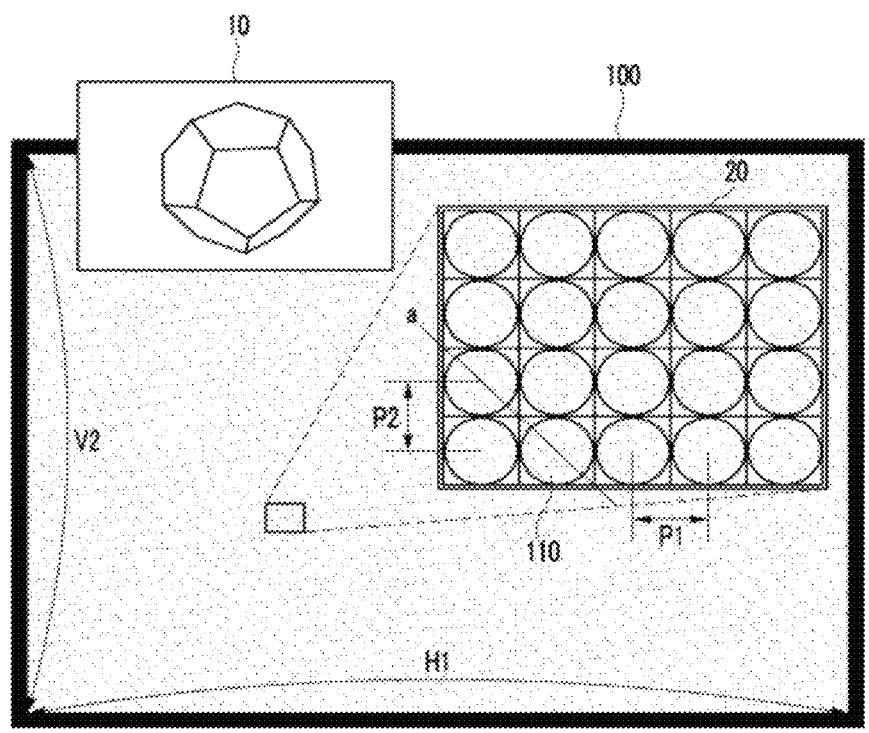
FIG. 2 is a plan view of a 3D artificial tactile presentation apparatus according to an exemplary embodiment of the present invention.

FIG. 2 is a plan view of a 3D artificial tactile presentation apparatus according to an exemplary embodiment of the present invention.

In FIG. 2, an area 20 is acquired by enlarging a part of a plane of the 3D artificial tactile presentation apparatus 100. As shown in FIG. 2, the 3D artificial tactile presentation apparatus 100 according to the exemplary embodiment of the present invention includes a plurality of tactile cells 110. The plurality of tactile cells 110 are arranged on the plane as a horizontal pitch P1 and a vertical pitch P2. The horizontal pitch P1 and the vertical pitch P2 correspond to minimum horizontal and vertical resolutions expressing the depth of the picture.

The product of the horizontal resolution H1 and the vertical resolution V2 may be equal to the depth resolution of the picture.

Figure 3:
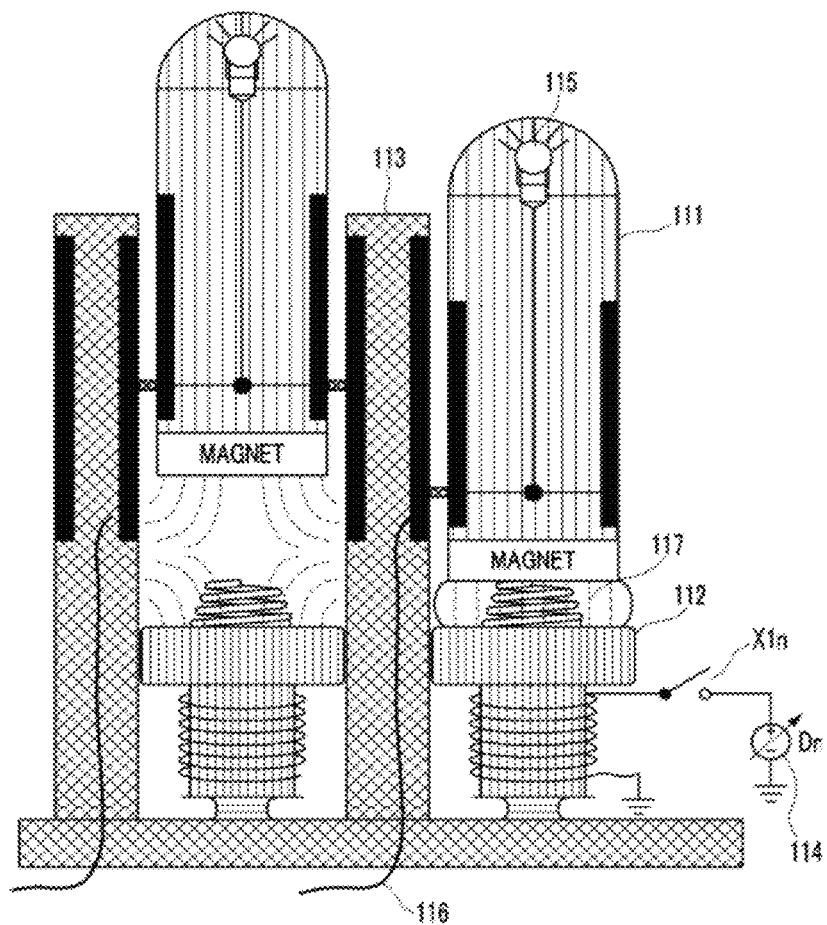
FIG. 3 shows the structure of a cell system of the 3D artificial tactile presentation apparatus according to the exemplary embodiment of the present invention.

When a subject is captured by a depth camera, a depth image including a picture and the depth information is acquired. For example, the 3D artificial tactile presentation apparatus 100 extracts a depth image signal from a regular isosahedron picture 10 displayed on a monitor, and provides the depth information to each protrusion 110 to provide a 3D artificial tactile similar to a picture displayed on the monitor. FIG. 3 shows the structure of a cell system of the 3D artificial tactile presentation apparatus according to the exemplary embodiment of the present invention. In particular, FIG. 3 shows a cross-section a of the predetermined area 20.

As shown in FIG. 3, the tactile cell 110 includes a tactile feeder 111, a tactile reactor 112, a supporter 113, a control signal generator 114, a pressure sensor 115, an interface line 116, a spring 117, a switch X1 n, and a controller (not shown).

The tactile feeder 111 includes a permanent magnet, a body, the pressure sensor 115 for transferring interaction with the picture, and an ultrasound vibration device providing vibration tactility.

The tactile reactor 112 corresponds to an electromagnet, and generates magnetic force that varies depending on the depth information.

The supporter 113 supports the tactile feeder 111. Further, the supporter 113 shields the permanent magnet and the tactile reactor 112 to store the magnetic force of the permanent magnet and the tactile reactor 112 in the tactile cell 110. The supporter 113 includes the interface line 116 that transfers a texture signal to the tactile feeder 111 through a touch point with the tactile feeder 111 and transfers a pressure measurement signal from the tactile feeder 111 to a picture system.

In general, since the tactile feeder 111 and the tactile reactor 112 have different polarities, the tactile feeder 111 and the tactile reactor 112 are attached to each other. The control signal generator 114 receives information on the depth of an image pixel and generates a control signal Dn depending on the depth information. The control signal generator 114 may call from a memory voltage that matches the depth of a pixel as a voltage value compensated by considering various variables in the apparatus.

The switch X1n provides the control signal Dn to the corresponding tactile reactor 112 according to information on the position of the image pixel. Then, current that flows by the control signal Dn converts the tactile reactor 112 to the electromagnet having the magnetic force. A polarity of the tactile reactor 112 is the same as that of a surface of the permanent magnet of the tactile feeder 111 facing the tactile reactor 112, and as a result, the tactile feeder 111 and the tactile reactor 112 have a repulsive force from each other. Accordingly, the tactile feeder 111 moves up according to the intensity of the repulsive force.

If information expressing tactility of an object can be additionally provided, the ultrasound vibration device in the tactile feeder 111 generates minute vibrations according to texture information. As described above, the ultrasound vibration device transfers the minute vibration to a palm that touches the 3D artificial tactile presentation apparatus 100 to allow the user to feel tactility of a surface texture of the object.

Meanwhile, impact or pressure applied to the tactile feeder 111 is converted into an electrical signal through the pressure sensor 115 constituted by piezoelectricity to be fed back to the picture system. As a result, the picture system may reflect the change in the object to the picture according to the pressure measurement signal.

Figure 4:
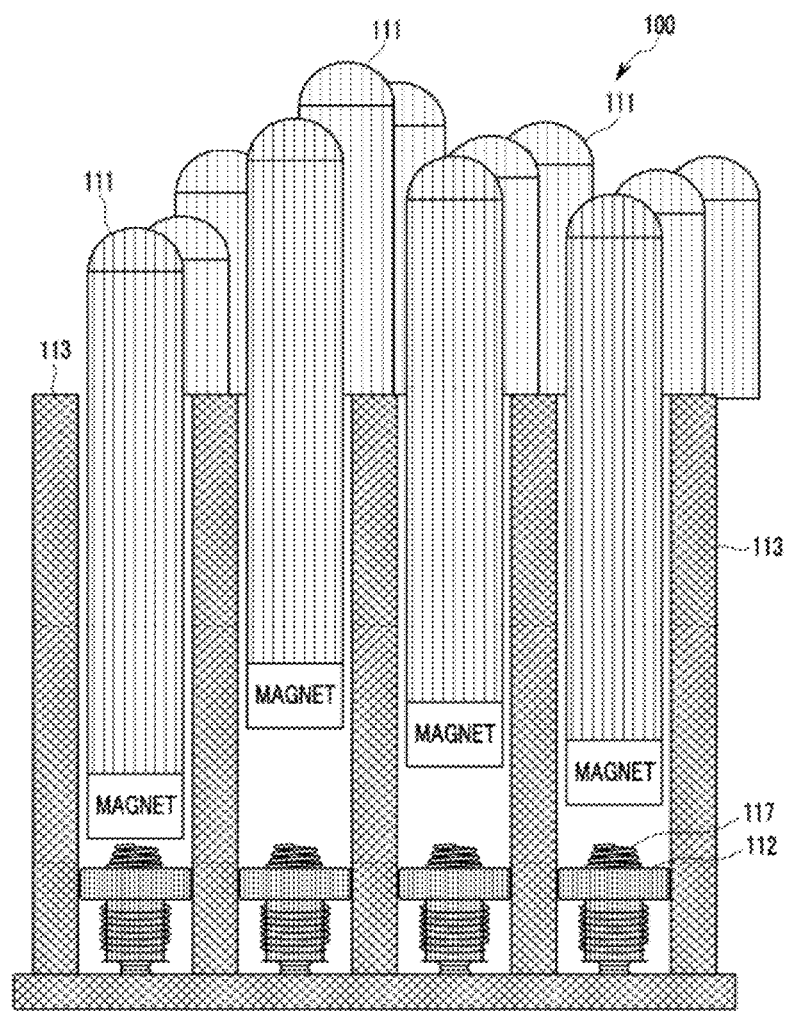
FIG. 4 shows an operational state of a tactile cell according to the exemplary embodiment of the present invention.

FIG. 4 shows an operational state of a tactile cell according to the exemplary embodiment of the present invention.

As shown in FIG. 4, in the 3D artificial tactile presentation apparatus 100, the plurality of tactile feeders 111 arranged on the plane are arranged. Each tactile feeder 111 includes a permanent magnet in the lower part thereof. In addition, the spring 117 and the tactile reactor 112 are placed below each tactile feeder 111. The tactile feeder 111 and the tactile reactor 112 are surrounded by the supporter 113 for each tactile cell.

Since the tactile feeders 111 have different heights according to the depth information on the pixel by the magnetic force generated by the tactile reactor 112, an actual surface of the object is implemented by expressing a curve on the surface.

Figure 5:
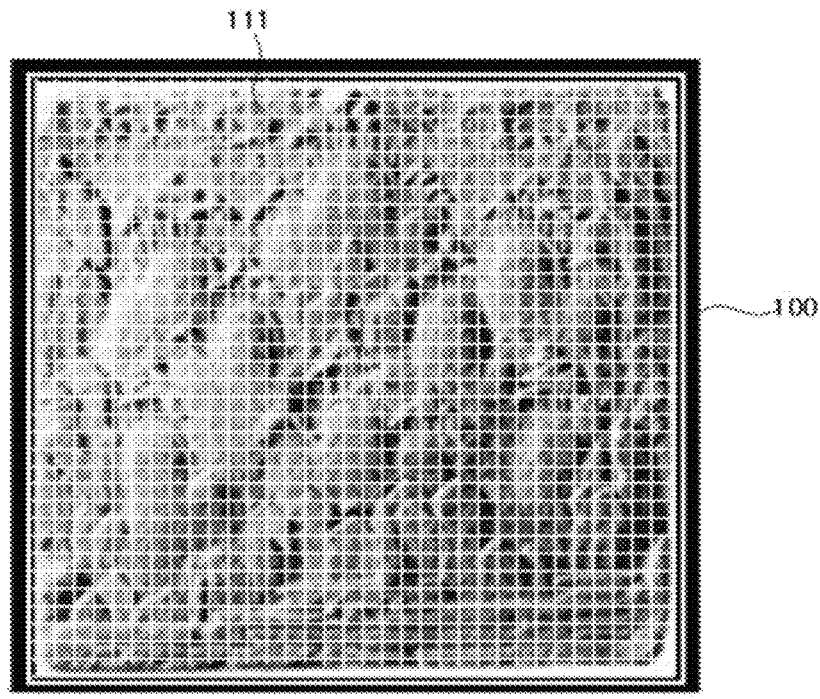
FIG. 5 shows the curve on the surface of the 3D artificial tactile presentation apparatus according to the exemplary embodiment of the present invention.

FIG. 5 shows the curve on the surface of the 3D artificial tactile presentation apparatus according to the exemplary embodiment of the present invention.

As shown in FIG. 5, the 3D artificial tactile presentation apparatus 100 according to the exemplary embodiment of the present invention includes a plurality of tactile feeders 111 of as many as the number of pixels of the depth image, and the plurality of tactile feeders 111 are arranged on a rectangular plane. When the 3D artificial tactile presentation apparatus 100 receives depth information for a plurality of pixels of the depth image, the magnetic force depending on the depth information is generated to control the heights of the tactile feeders 111. As a result, the 3D artificial tactile presentation apparatus 100 implements the actual surface of the object on the rectangular plane by using the plurality of tactile feeders 111 that are relatively projected and depressed, as shown in FIG. 5.

Figure 6:
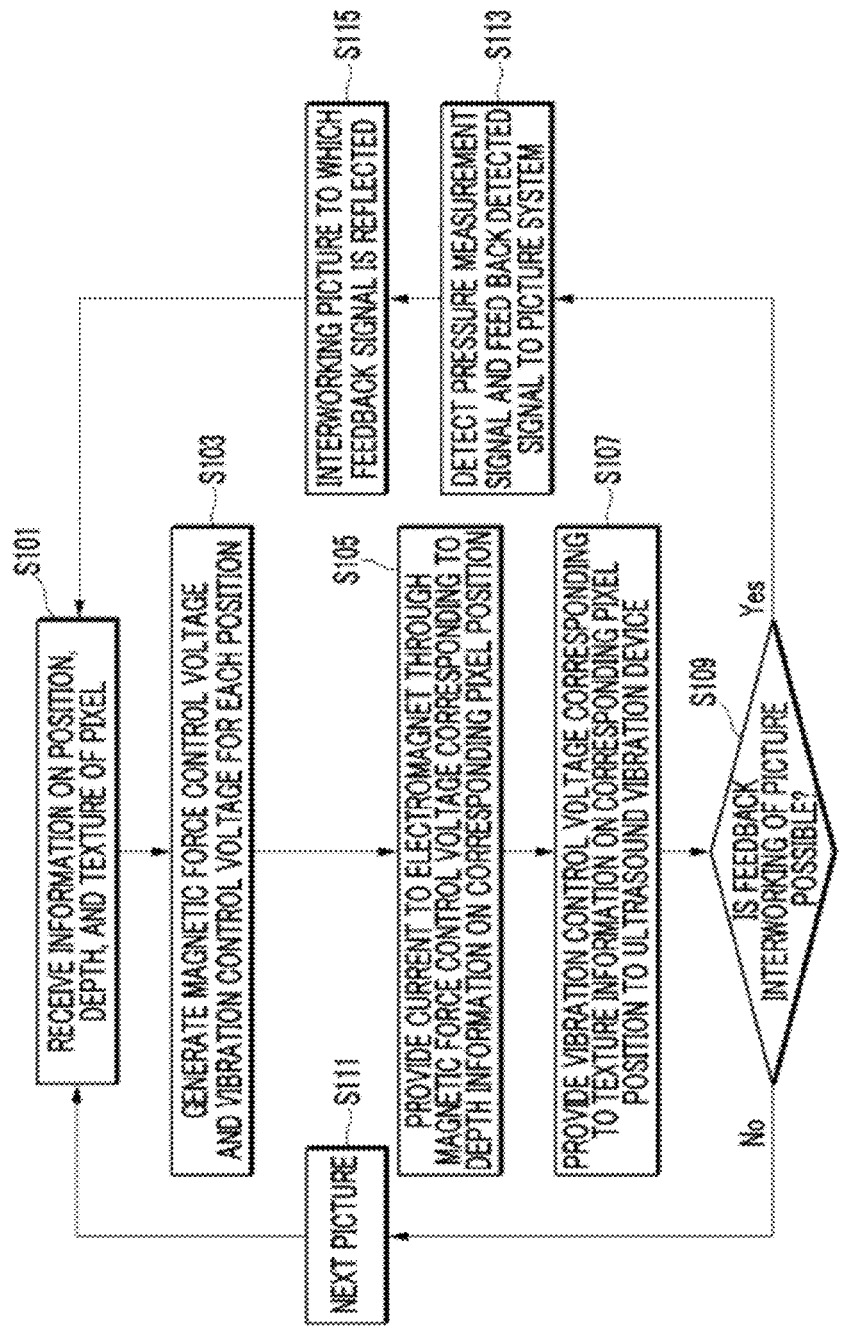
FIG. 6 is a flowchart showing a method for controlling a 3D artificial tactile presentation apparatus according to an exemplary embodiment of the present invention.

FIG. 6 is a flowchart showing a method for controlling a 3D artificial tactile presentation apparatus according to an exemplary embodiment of the present invention.

First, a control unit of the 3D artificial tactile presentation apparatus 100 receives information on the position, depth, and texture of a pixel of a picture (S101).

The control unit extracts a compensation voltage value corresponding to the depth of the pixel from a magnetic force control voltage table to generate a magnetic force control voltage, and extracts a compensation voltage value corresponding to the texture of the pixel from a vibration control voltage table to generates the vibration control voltage (S103). The magnetic force control voltage table and the vibration control voltage table are stored in a memory of the control unit.

The control unit provides a current to an electromagnet of a tactile cell corresponding to the position of the pixel through magnetic force control voltage corresponding to the depth of the pixel (S105).

Further, the control unit provides the vibration control voltage corresponding to the texture of the pixel to an ultrasound vibration device of the tactile cell corresponding to the position of the pixel (S107). Meanwhile, the control unit judges whether feedback interworking of the picture is possible (S109).

If the feedback interworking of the picture is not possible, the control unit controls a subsequent picture (S111).

If the feedback interworking of the picture is possible, the control unit receives a pressure measurement signal from the pressure sensor 115 and provides the received pressure measurement signal to a picture system as a feedback signal (S113) to allow the picture system to display an interworked picture to which the feedback signal is reflected (S115).

According to exemplary embodiments of the present invention, a user can feel a 3D virtual texture through a simple system associated with depth information. Further, the user can experience an interaction and association service with a virtual object without using a plurality of cameras, and easily feel surface texture having a high resolution with his/her hand without attaching any device to a finger or a human body.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A tactile presentation apparatus, comprising:
a plurality of tactile cells, wherein the number of the plurality of tactile cells is equal to the number of pixels of a depth image, and each of the plurality of tactile cells implements depth information and texture information of the depth image and measures applied pressure information by using an embedded pressure sensor, wherein, each of the plurality of tactile cells includes:

a tactile reactor generating a magnetic force of an electromagnet according to a magnetic force control voltage depending on the depth information of the depth image, a tactile feeder that moves up or down according to the magnetic force, and an ultrasound vibration device that vibrates according to a vibration control voltage, wherein, the magnetic force control voltage is obtained based on a compensation voltage value corresponding to the depth information of the depth image, and the vibration control voltage is obtained based on a compensation voltage value corresponding to the texture information of the depth image.

2. The apparatus of claim 1, further comprising:

a controller providing the magnetic force control voltage depending on the depth information of the depth image to the plurality of tactile cells.

3. The apparatus of claim 2, wherein:

the tactile feeder includes a permanent magnet on the bottom thereof.

4. The apparatus of claim 2, wherein:

the tactile feeder includes the embedded pressure sensor measuring the applied pressure information.

5. The apparatus of claim 4, wherein:

each of the plurality of tactile cells further includes a supporter shielding the magnetic force, guiding movement of the tactile feeder, and surrounding the tactile feeder and the tactile reactor.

6. The apparatus of claim 5, wherein:

the controller provides the vibration control voltage according to the texture information of the depth image to the plurality of tactile cells.

7. The apparatus of claim 6, wherein:

the supporter includes an interface line that provides the vibration control voltage corresponding to the texture information to the ultrasound vibration device through a touch point with the tactile feeder, and receives a pressure measurement signal from the embedded pressure sensor to feed back the received pressure measurement signal to a picture system.

8. The apparatus of claim 6, wherein:

the controller includes a memory including a magnetic force control voltage table and a vibration control voltage table, the controller verifies the compensation voltage value corresponding to the depth information of the depth image in the magnetic force control voltage table to provide the magnetic force control voltage to the plurality of tactile cells, and the controller verifies the compensation voltage value corresponding to the texture information of the depth image in the vibration control voltage table to provide the vibration control voltage to the plurality of tactile cells.

9. A method for controlling a tactile presentation apparatus that comprises a plurality of tactile cells, wherein each of the plurality of tactile cells includes a tactile reactor, a tactile feeder, and an ultrasound vibration device, the method comprising:

receiving information on the position, depth, and texture of each pixel of a depth image, wherein the number of pixels of the depth image is equal to the number of the plurality of tactile cells;

measuring applied pressure information by using an embedded pressure sensor;

generating a magnetic force control voltage according to the depth information of the depth image;

generating a vibration control voltage according to the texture information of the depth image;

generating, by the textile reactor, a magnetic force of an electromagnet of a tactile cell of the plurality of tactile cells according to a magnetic force control voltage;

providing current to the electromagnet of the tactile cell of the plurality of tactile cells corresponding to the position information of the depth image through the magnetic force control voltage;

actuating the tactile feeder to move up or down according to the magnetic force; and actuating the ultrasound vibration device to vibrate according to the vibration control voltage;

wherein the magnetic force control voltage is obtained based on a compensation voltage value corresponding to the depth information of the depth image, and wherein the vibration control voltage is obtained based on a compensation voltage value corresponding to the texture information of the depth image.

10. The method of claim 9, wherein the generating of the magnetic force control voltage includes:

verifying the compensation voltage value corresponding to the depth information of the depth image in a magnetic force control voltage table, and generating the magnetic force control voltage corresponding to the verified compensation voltage value corresponding to the depth information of the depth image.

11. The method of claim 10, wherein the tactile feeder includes the embedded pressure sensor measuring the applied pressure information, and the tactile presentation control method further includes providing a pressure measurement signal from the embedded pressure sensor to a picture system.

12. The method of claim 11, wherein the generating of the vibration control voltage includes:

verifying the compensation voltage value corresponding to the texture information of the depth image in a vibration control voltage table, and generating the vibration control voltage corresponding to the verified compensation voltage value corresponding to the texture information of the depth image.

* * * * *